United States Patent [19]
Jardine et al.

[11] 3,908,448
[45] Sept. 30, 1975

[54] METHOD AND APPARATUS FOR TESTING RESISTANCE TO TRANSVERSE TORSIONAL VIBRATION OF TEETH OF FLEXIBLE POWER TRANSMISSION MEMBERS

[75] Inventors: Robert D. Jardine, Dumfries, Scotland; Henry G. Ellington, Preston, England

[73] Assignee: Uniroyal Limited, Midlothian, Scotland

[22] Filed: Dec. 10, 1973

[21] Appl. No.: 423,328

[30] Foreign Application Priority Data
Dec. 13, 1972 United Kingdom............... 57436/72

[52] U.S. Cl. ...................... 73/91; 73/67.3; 73/70.1; 73/100; 73/162
[51] Int. Cl.² ................. G01N 3/00; G01M 7/00; G01M 13/02
[58] Field of Search ............ 73/67.3, 70.1, 91, 100, 73/101, 162

[56] References Cited
UNITED STATES PATENTS
| 2,316,253 | 4/1943 | Keinath | 73/70.1 |
| 2,603,084 | 7/1952 | Waddell | 73/100 |
| 3,739,632 | 6/1973 | Miller et al. | 73/162 |

FOREIGN PATENTS OR APPLICATIONS
| 20,406 | 10/1914 | United Kingdom | 73/162 |

*Primary Examiner*—Donald O. Woodiel
*Assistant Examiner*—John S. Appleman
*Attorney, Agent, or Firm*—Norbert P. Holler, Esq.

[57] ABSTRACT

Methods and means for testing toothed flexible power transmission members, such as positive drive belts and flexible couplings, by simulating the effects of torsional vibrations on the teeth, are disclosed. In a test, the teeth at one part of the member being tested are anchored against movement while the teeth at another part are transversely vibrated. A belt-testing device designed for this purpose includes a rotatable toothed pulley and at least one stationary toothed pulley around all of which the belt being tested is trained under tension, and motor-driven cam or crank means for oscillating the rotatable pulley about its axis. Correspondingly, a coupling-testing device includes a stationary toothed hub and a rotatable toothed hub onto which the respective opposite end regions of the coupling being tested are fitted, and motor-driven cam or crank means for oscillating the rotatable hub about its axis. Indications of belt or coupling quality may be obtained with the aid of strain gages affixed to the test specimen at suitable locations, by counting the number of oscillations or the time to failure, or otherwise, in ways well known to the art. This abstract is not to be taken either as a complete exposition or as a limitation of the present invention, however, the full nature and extent of the invention being discernible only by reference to and from the entire disclosure.

18 Claims, 5 Drawing Figures

METHOD AND APPARATUS FOR TESTING RESISTANCE TO TRANSVERSE TORSIONAL VIBRATION OF TEETH OF FLEXIBLE POWER TRANSMISSION MEMBERS

This invention relates to the art of testing toothed drive or power transmission members, i.e. toothed belts and toothed flexible couplings, to determine the effects of torsional vibrations on the teeth of such members.

Toothed belts of fabric- or cord-reinforced rubber or like elastomeric polymeric materials, generally known as positive drive belts, are widely used as flexible power transmission members between two or more toothed pulleys. Correspondingly, sleeve-shaped, internally toothed flexible couplings of reinforced elastomeric polyermic materials are widely used as power transmission members between the facing, axially toothed hubs of two generally longitudinally codirectional shafts. Particularly when such a belt or coupling is used in an automotive vehicle, one or more of the associated rigid toothed structures (pulleys or shaft hubs) may be subjected to torsional vibrations. This will have the effect of vibrating the teeth of the belt or coupling transversely to the teeth and thereby of causing the teeth to be subjected to more or less severe stresses at the roots of the teeth. The testing of belts and couplings under actual operating conditions for their ability to withstand such stresses is, however, both difficult and time-consuming.

It is, therefore, an important object of the present invention to provide novel test equipment and methods for testing toothed flexible belts and couplings in a way which will simulate the effect of torsional pulley or shaft vibration thereon.

Generally speaking, the objectives of the present invention are attained by anchoring the teeth at one part of such a belt or coupling against movement and subjecting the teeth at another part of the belt or coupling to an oscillatory or vibratory movement transversely to the lengths of the teeth. In its basic form, correspondingly, a testing device according to the present invention comprises a support, a shaft rotatably mounted on the support, a first rigid toothed structure mounted on the shaft, a cam follower eccentrically secured to the shaft, a cam or like member engaging the cam follower, means for rotating the cam or like member to cause the shaft to oscillate about its axis together with the first rigid toothed structure, and at least one second rigid toothed structure immovably mounted on the support. Accordingly, when a toothed flexible power transmission member being tested has the teeth at different parts of said member in meshing engagement with the respective rigid toothed structures, the transmission member is held generally stationary throughout even though the rotatable rigid toothed structure is oscillating. Those of the teeth of the transmission member which are in engagement with the oscillating toothed structure are, however, being transversely vibrated. In this manner, the effect on the teeth of a torsionally vibrating pulley or shaft hub is simulated.

An important advantage of the testing apparatus of the present invention, apart from its simplicity, is that the dynamic testing is confined to a single section of the transmission member while the remainder thereof stays in a static condition. In the case of a belt test, therefore, as only a single section of the member is being flexed, the belt can be tested much more rapidly than if the vibrations were to be induced sequentially along its full length as they would be if the belt were being driven.

The foregoing and other objects, characteristics and advantages of the present invention will be more clearly understood from the following detailed description thereof when read in conjunction with the accompanying drawings, in which.

Figure 1:
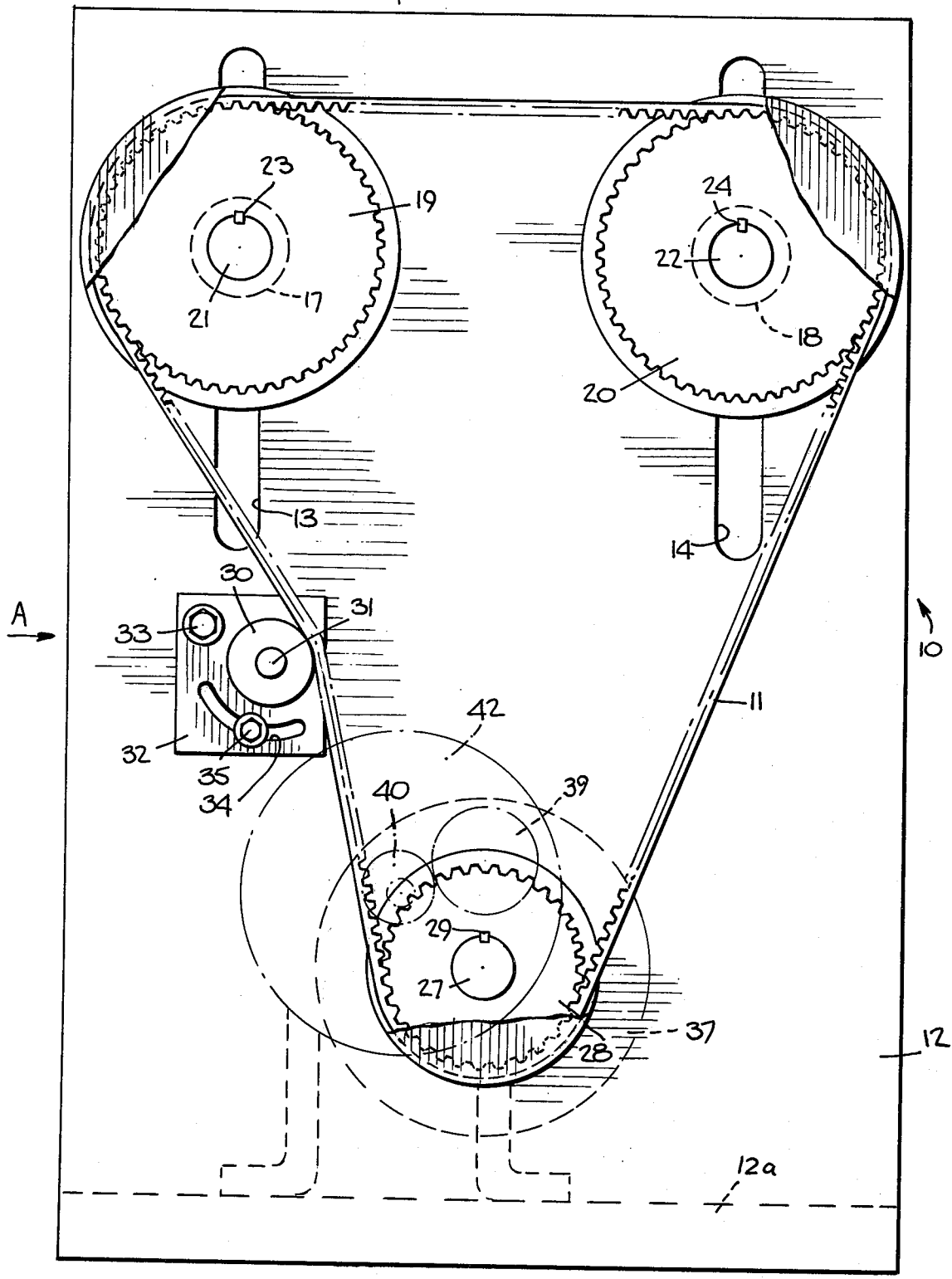
FIG. 1 is a front elevational view, partly broken away, of a belt-testing device according to the present invention.
Figure 2:
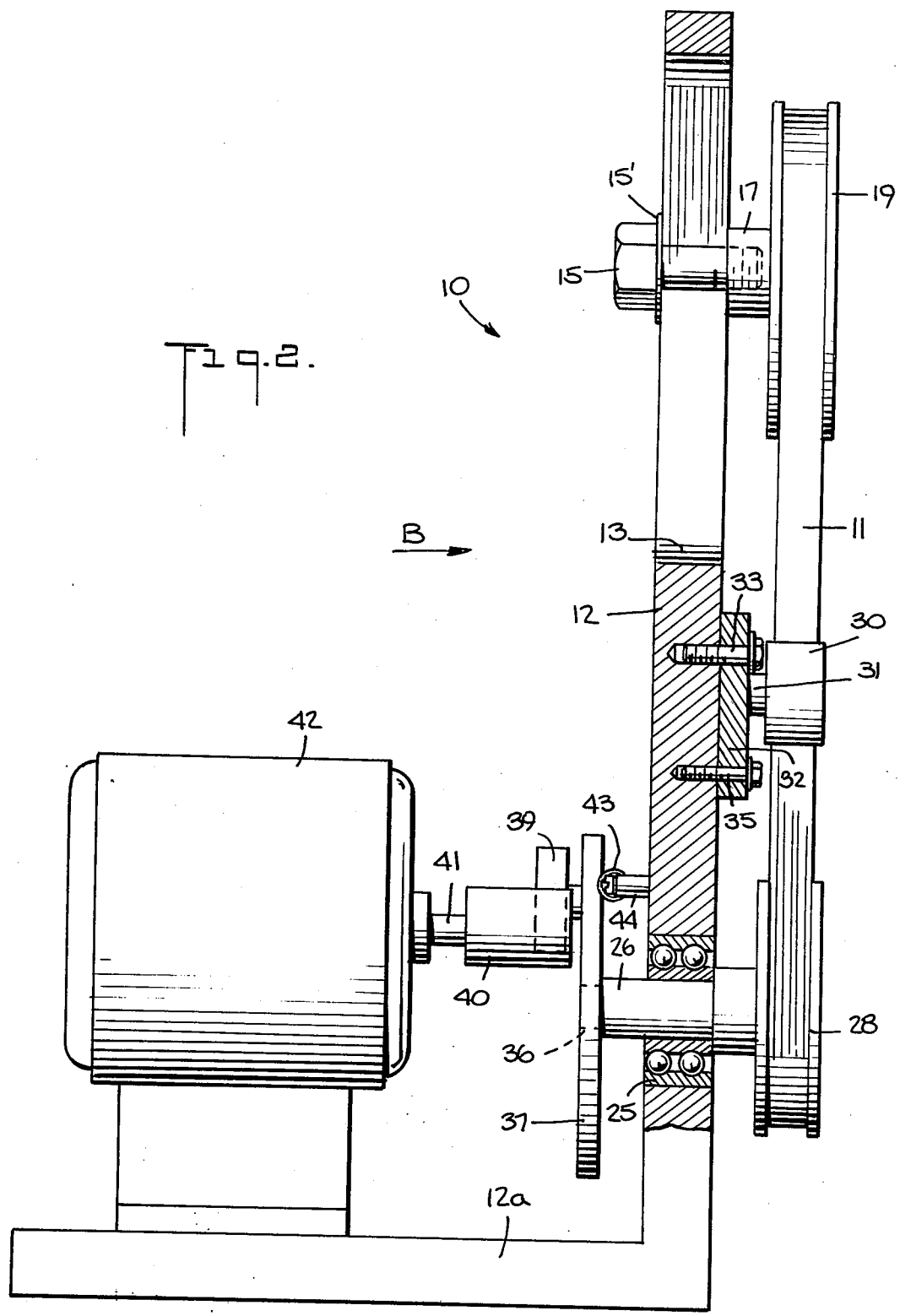
FIG. 2 is a partly sectional side elevational view of the device, the view being taken in the direction of the arrow A in FIG. 1.
Figure 3:
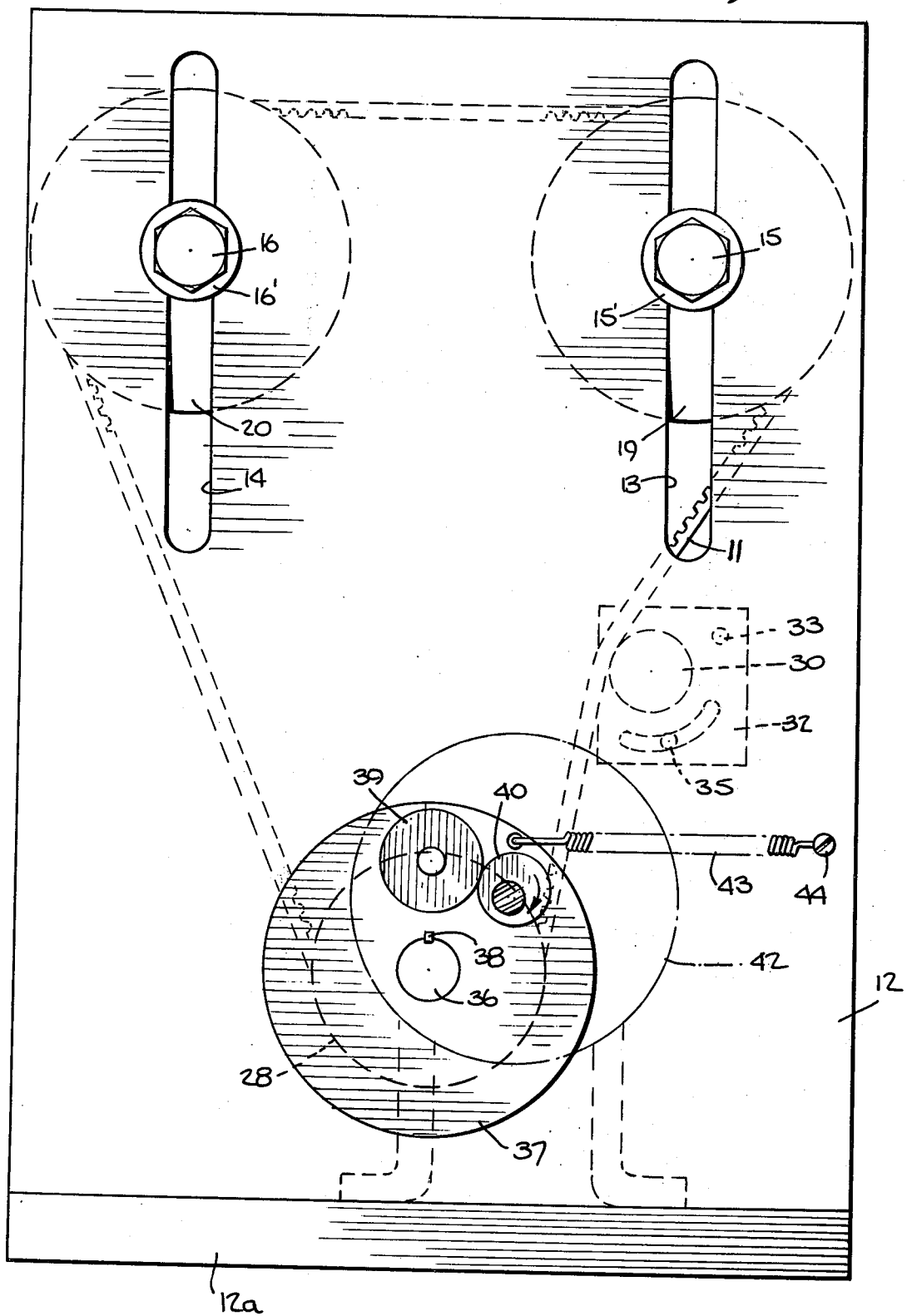
FIG. 3 is a rear elevational view of the device, the view being taken in the direction of the arrow B in FIG. 2, with the motor shown only in phantom outline for clarity.

Referring now to the drawings in greater detail, a device 10 according to the present invention for testing a toothed transmission belt 11 is shown in FIGS. 1 to 3. The device 10 comprises a vertical support 12 having a base portion 12a. In its upper region, the support 12 is provided with two spaced vertical slots 13 and 14. Slidably extending through the slots 13 and 14 are the shanks of respective screw bolts 15 and 16, the heads of which bear against the rear face of the support 12 via interposed washers 15' and 16'. The threaded ends of the bolts 15 and 16 are screwed into correspondingly threaded bores of a pair of enlarged bushings 17 and 18 located at and bearing against the front face of the support. Toothed pulleys 19 and 20 are mounted on respective stub shaft extensions 21 and 22 of the bushings and secured against rotation relative thereto by means of keys 23 and 24.

It will be understood, therefore, that by means of the bolts 15 and 16, the bushings 17 and 18 can be selectively loosened from and tightened against the support, so as to permit the pulleys 19 and 20 to be adjusted to any desired locations along the slots 13 and 14 and to be locked in place in their adjusted positions.

In its lower region, the support 12 is provided with a bearing 25 in which is journaled a shaft 26. At the front of the support, the shaft has a stub shaft extension 27 (FIG. 1) on which a toothed pulley 28 is mounted and to which the pulley is keyed at 29 for rotation therewith and against relative rotation thereto. The pulley 28 is disposed in coplanar relation to the pulleys 19 and 20, so that the belt 11 to be tested can be properly trained about them. Intermediate the pulleys 19 and 28, adjustable means is provided for tensioning the belt. Merely by way of example, the tensioning means is shown as including a relatively small belt-engaging drum or roll 30 fixedly mounted on a shaft 31 secured to a plate 32. The plate is pivotally mounted on the support 12 by means of a bolt 33 fitting freely through the plate and screwed into the support. The plate 32 is further provided with an arcuate slot 34 through which freely extends a bolt 35 also screwed into the support 12. The arrangement is such that the plate 32 can be locked in any selected one of a range of angular positions, thereby to vary the belt tension accordingly.

Reverting now to the pulley shaft 26, the same has a second stub shaft extension 36 at its rear end on which a circular drive plate 37 is mounted and to which the plate is keyed at 38 for joint rotational movement. Near its periphery on its rear face, the plate 37 carries a rotatable disc or roller 39. The roller, which is in the nature of a cam follower, is in rolling engagement with a cam or eccentric 40 mounted on the output shaft 41 of an electric motor 42 fixedly located on the base 12a of the support 12. The cam may be either radially adjustable relative to the shaft 41, or simply releasably secured thereto so as to be selectively replaceable by cams of other degrees of eccentricity, in either case for enabling the throw of the cam to be varied. The axis of rotation of the follower disc 39 and the axis of rotation of the cam 40 are equidistant from the axis of the pulley shaft 26. A tension spring 43 anchored at one end to the plate 37 and at the other end to a rod or pin member 44 projecting from the support 12 serves to bias the follower disc 39 against the cam or eccentric 40 so as to maintain the same in continuous contact with one another.

To carry out a belt test, the anchoring pulleys 19 and 20 are adjusted and fixed in place on the support 12 in any desired relationship to the rotatable pulley 28. Preferably, their disposition should be such that the belt will extend along a path around the pulleys simulating the path along which it would run in actual use. After the belt has been meshed with the three pulleys, the plate 32 is angularly adjusted to locate the tensioning drum 30 so as to impart the desired tension to the belt. It should be understood, of course, that although the device 10 has been shown as including three pulleys, the belt could be trained around only two of them, i.e. the pulley 28 and either the pulley 19 or the pulley 20. Also, the device could be provided with more than three pulleys if needed for proper simulation of the run of the belt in actual use conditions.

With the cam 40 set to the desired throw, the motor 42 is then started to effect rotation of the cam. As a result, the cam follower disc 39 is reciprocated along an arc centered on the axis of the drive plate 37, which causes the latter and therewith the shaft 26 and pulley 28 to oscillate through an equivalent arc the extent of which depends on the throw of the cam or eccentric 40. As the belt is held stationary by the pulleys 19 and 20, however, the effect of this oscillation of the pulley 28 is to vibrate the teeth of the belt in engagement therewith transversely of their longitudinal dimensions, so simulating the effect of a torsionally vibrating pulley on the belt.

Figure 4:
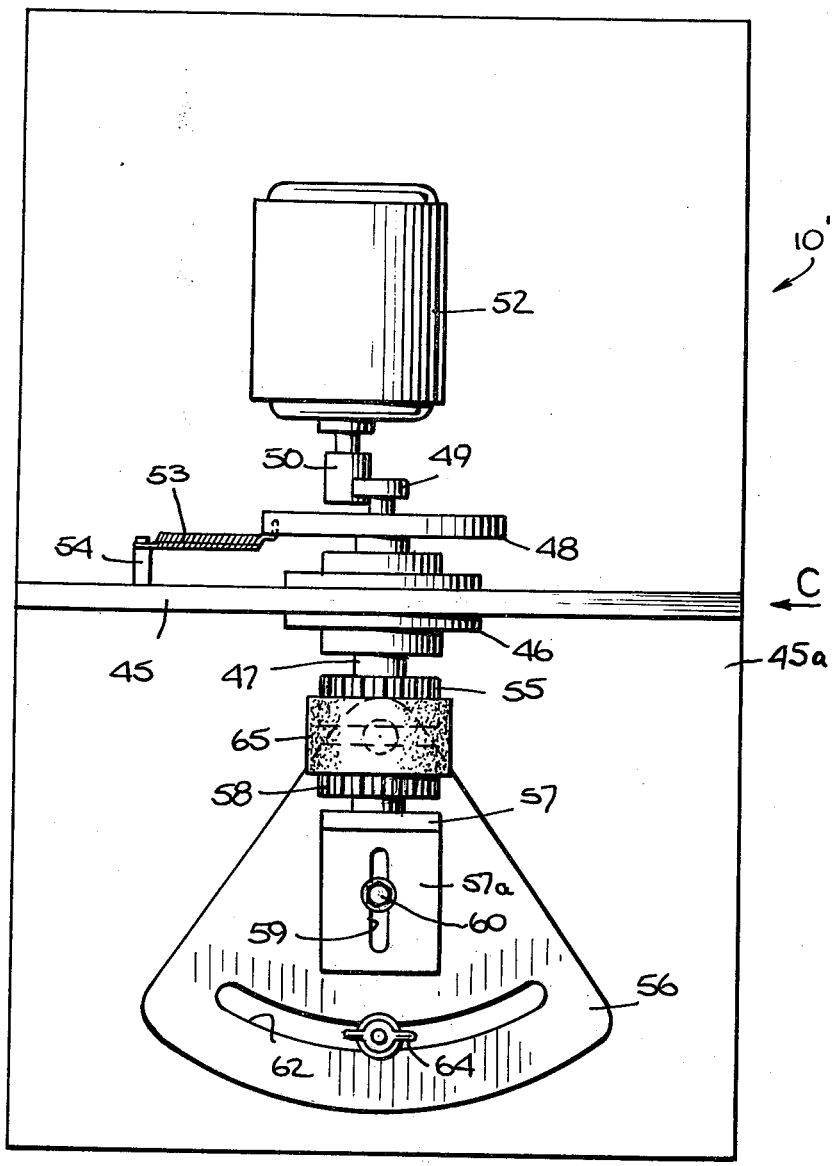
FIG. 4 is a top plan view of a coupling-testing device according to the present invention.
Figure 5:
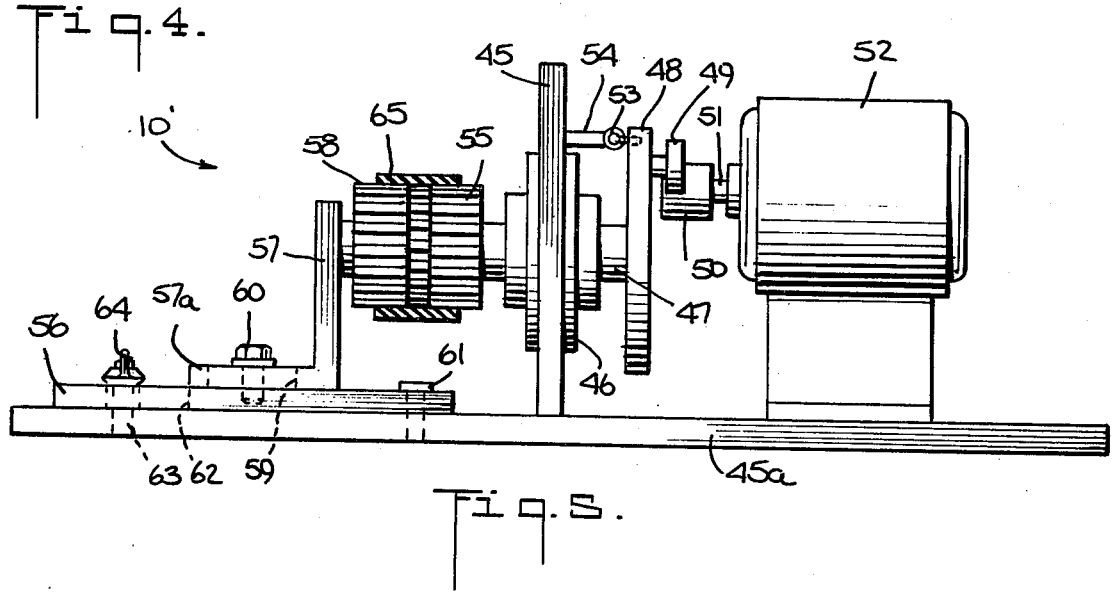
FIG. 5 is a partly sectional side elevational view of the coupling-testing device, the view being taken in the direction of the arrow C in FIG. 4.

Turning now to FIGS. 4 and 5, the apparatus 10' there shown is designed for testing toothed flexible couplings but basically utilizes the same principles of construction and operation as the belt-testing apparatus 10. The coupling-testing apparatus 10' comprises a vertical support 45 having a base 45a. Arranged in the support 45 is a bearing 46 in which a shaft 47 is journaled. At one end, the shaft carries a drive plate 48 on which is mounted a rotatable cam follower disc 49. The disc 49 is in rolling contact with an eccentric or cam 50 adjustably or replaceably secured to the output shaft 51 of an electric motor 52 mounted on the base 45a to one side of the support 45, the contact being maintained under the action of a tension spring 53 anchored at one end to the plate 48 and at the other end to an adjunct 54 of the support 45. At its other end, located on the side of the support 45 remote from the motor 52, the shaft 47 carries a rigid toothed hub 55.

Slidably arranged on the base 45a on the same side of the support 45 as the hub 55 is a plate 56 on which is arranged the base portion 57a of an upstanding bracket 57. The bracket carries a second rigid toothed hub 58 facing the hub 55 and is equipped for linear adjustment of the hub 58 toward and away from the hub 55 by means of a slot 59 in the base portion 57a and a cooperating bolt 60 screwed into the plate 56. The latter is arranged for angular displacement over the base 45a by means of a bolt 61 extending freely through the plate and screwed into the base 45a at a point slightly forward of the free end of the hub 55, in order to enable the hub 58 to be disposed out of axial alignment with the hub 55 so as to simulate a degree of longitudinal misalignment of a pair of shafts. To enable the plate 56 to be locked in any desired adjusted position, it is further provided with an arcuate slot 62 slidably accommodating a threaded rod 63 extending upwardly from the base 45a and having a cooperating wing nut 64 arranged thereon.

To carry out a coupling test, one end section of a toothed coupling 65 is fitted onto the hub 55, and the other hub 58 is then fitted into the other end section of the coupling, normally to such an extent that the coupling sits equally on the two hubs. With the cam 50 set to the desired throw and the hub 58 locked in position (ordinarily in axial alignment with the hub 55), the motor is then started, so that the shaft 47 and the hub 55 are oscillated through an arc dependent on the throw of the cam. As a result, one axial section of the coupling teeth is subjected to transverse vibration, while another axial section is held stationary by the hub 58, so that again the effects of torsional vibration are simulated.

It will, of course, be clear to those skilled in the art that indications of the quality (e.g. service life, resistance to tooth shear or cracking, etc.) of either a belt or a coupling being tested can be obtained in various ways all of which are well known and the means for which have not been illustrated. Merely by way of example, the testing device may utilize either a counter for determining the number of oscillations, or a timer for determining the time, required for the test specimen to fail, or the attainment of some other point short of failure (e.g. the ability to withstand a given number of oscillations or a prescribed test period) may be used as the criterion. Such a counter or timer may be connected into the motor circuit so as to stop when the motor stops, or it may be independent of the motor circuit and arranged to be stopped manually (e.g. if the motor is stopped deliberately to permit a visual inspection of the test specimen or an adjustment of the testing device) or in response to a failure of the test specimen sensed mechanically, electrically or photo-electrically. If desired, strain gages affixed to the test specimen in the vicinity of the movable pulley or shaft hub and connected into a suitable bridge circuit may be used to generate signals which are representative of stress conditions in the test belt or coupling and its teeth and can be indicated on a meter or a recorder. In the case of a belt, furthermore, means will normally also be provided to determine the belt tension created by the selected setting of the drum or roll 30. The motor speed will, of course, be determined in the light of the test conditions to be maintained, i.e. the vibration frequency to be imparted to the teeth of the test specimen. A motor speed of 2,820 r.p.m. has been used and found acceptable in actual tests, but obviously the speed may be higher or lower than that.

It will be understood that the foregoing description of preferred embodiments of the present invention is for purposes of illustration only, and that the various structural and operational features and relationships herein disclosed may be embodied in a number of different structures and procedures none of which entails any departure from the spirit and scope of the present invention as defined in the hereto appended claims. Thus, under appropriate conditions, a crank system may be used in lieu of the described and illustrated cam and cam follower arrangment for oscillating the movable pulley or shaft hub, and different types of anchoring means operable for non-slip engagement with the test member or specimen, e.g. clamping devices of suitable construction, may be used in lieu of the toothed rigid structures shown and described. Still other alternatives and modifications will readily suggest themselves to those skilled in the art.

What is claimed is:

1. A method of testing a toothed flexible power transmission member for resistance of the teeth thereof to torsional vibrations transverse to the teeth, comprising the steps of engaging one section of said member with a correspondingly toothed rigid structure so as to place the teeth of the latter in mesh with the juxtaposed teeth of said member, anchoring another section of said member against movement, and oscillating said toothed rigid structure transversely to said teeth of said member for subjecting those of said teeth located at that section of said member engaged with said structure to transverse vibrations and thereby simulating the effects of torsional vibration on said teeth of said member.

2. The method of claim 1, wherein the oscillation of said toothed rigid structure is terminated after a predetermined number of cycles or a predetermined time interval, and said member is then inspected for the condition of said teeth thereof as a measure of the vibration-resisting character of said member.

3. The method of claim 1, wherein the oscillation of said toothed rigid structure is continued to failure of said member, and the number of cycles or the time interval required for reaching the failure point is taken as a measure of the vibration-resisting character of said member.

4. The method of claim 1, wherein the anchoring of said other section of said member comprises the steps of engaging those of said teeth of said member located at said other section thereof with a second correspondingly toothed rigid structure so as to place the teeth of the latter in mesh with the juxtaposed teeth of said member, and restraining said second toothed rigid structure against movement.

5. A testing device for testing a toothed flexible power transmission member for resistance of the teeth thereof to torsional vibrations transverse to the teeth, comprising a support, a shaft rotatably mounted on said support, a first rigid structure mounted on said shaft for rotation therewith, said first structure being toothed for meshing engagement thereof with a juxtaposed section of said member, means for oscillating said shaft about its axis, and a second rigid structure arranged against movement with said shaft and relative to said support, said second structure being constructed for non-slip engagement with another section of said member, whereby upon said sections of said member being in engagement with said first and second structures, respectively, said other section of said member is anchored and maintained stationary by said second structure while said first-named section of said member is oscillated by said first structure.

6. A testing device according to claim 5, wherein said means for oscillating said shaft comprises a drive motor, cam means driven by said motor, and cam follower means carried by said shaft and in constant contact with said cam means.

7. A testing device according to claim 6, further comprising means for adjusting the eccentricity of said cam means, thereby to permit the arc of oscillation of said shaft and said first rigid structure to be set to any desired magnitude.

8. A testing device according to claim 6, wherein said drive motor includes an output shaft, said cam means comprises an eccentric disc cam carried by and rotatable with said output shaft, and said cam follower means comprises a plate carried by said first-named shaft and movable therewith, and a roller carried by said plate eccentrically of the latter, the peripheral edge of said disc cam being in engagement with the peripheral surface of said roller.

9. A testing device according to claim 8, wherein the axis of said roller and the axis of said output shaft are equidistant from the axis of said first-named shaft.

10. A testing device according to claim 9, further comprising means operatively connected with said plate for biasing said roller against said disc cam.

11. A testing device according to claim 10, wherein said biasing means comprises spring means interconnected between said support and said plate.

12. A testing device for testing a toothed flexible power transmission member, comprising a support, a shaft rotatably mounted on said support, a first toothed rigid structure concentrically mounted on said shaft for rotation therewith, said first toothed rigid structure being constructed for meshing engagement thereof with a juxtaposed first section of said member, a cam follower carried by said shaft, a cam engaging said cam follower, means for driving said cam to cause said shaft and therewith said first toothed rigid structure to oscillate about the axis of said shaft, and at least one second toothed rigid structure fixed in position against movement with said shaft and relative to said support, said second toothed rigid structure being constructed for meshing engagement thereof with a juxtaposed second section of said member, whereby upon said first and second sections of said member being in meshing engagement with said first and second toothed rigid structures, said second section of said member is anchored and maintained stationary while said first section of said member is oscillated.

13. A testing device for testing a toothed, flexible, positive-drive power transmission belt for resistance of the teeth thereof to torsional vibrations transverse to the teeth, comprising a support, a shaft rotatably mounted on said support, a first rigid toothed pulley concentrically mounted on said shaft for rotation therewith, said first pulley being adapted for meshing engagement of its teeth with those of said belt, a cam follower carried by said shaft, a cam engaging said cam follower, means for driving said cam to cause said shaft and therewith said first pulley to oscillate about the axis of said shaft, and at least one second rigid toothed pulley adjustably mounted on said support and fixed in position against movement relative to said support, said second pulley being adapted for meshing engagement of its teeth with those of said belt, whereby upon said belt being trained about said pulleys, one section of said belt is anchored and maintained stationary by said second pulley while another section of said belt is subjected to oscillations by said first pulley to simulate the effects of torsional vibration on the teeth of said belt.

14. A testing device according to claim 13, further comprising means mounted on said support for adjusting the tension of a belt trained about said pulleys.

15. A testing device according to claim 13, wherein there are provided two second pulleys adjustably mounted on said support.

16. A testing device for testing a toothed, flexible, sleeve-shaped power transmission coupling for resistance of the teeth thereof to torsional vibrations transverse to the teeth, comprising a support, a shaft rotatably mounted on said support, a first rigid toothed hub mounted on said shaft for rotation therewith, said first hub being adapted for meshing engagement of its teeth with those of said coupling, a cam follower carried by said shaft, a cam engaging said cam follower, means for driving said cam to cause said shaft and therewith said first hub to oscillate about the axis of said shaft, and a second rigid toothed hub adjustably mounted adjacent said support in end to end facing relation to said first hub, said second hub being adapted for meshing engagement of its teeth with the teeth of said coupling, whereby upon said coupling being engaged at the two end sections thereof with both said hubs, respectively, one end section of said coupling is anchored and maintained stationary by said second hub while the other end section of said coupling is oscillated by said first hub to simulate the effects of torsional vibration on the teeth of said coupling.

17. A testing device according to claim 16, further comprising means for adjusting said second hub linearly toward and away from said first hub.

18. A testing device according to claim 17, further comprising means for adjusting said second hub angularly relative to said first hub to enable an axial misalignment between said hubs to be created.

* * * * *